UNITED STATES PATENT OFFICE.

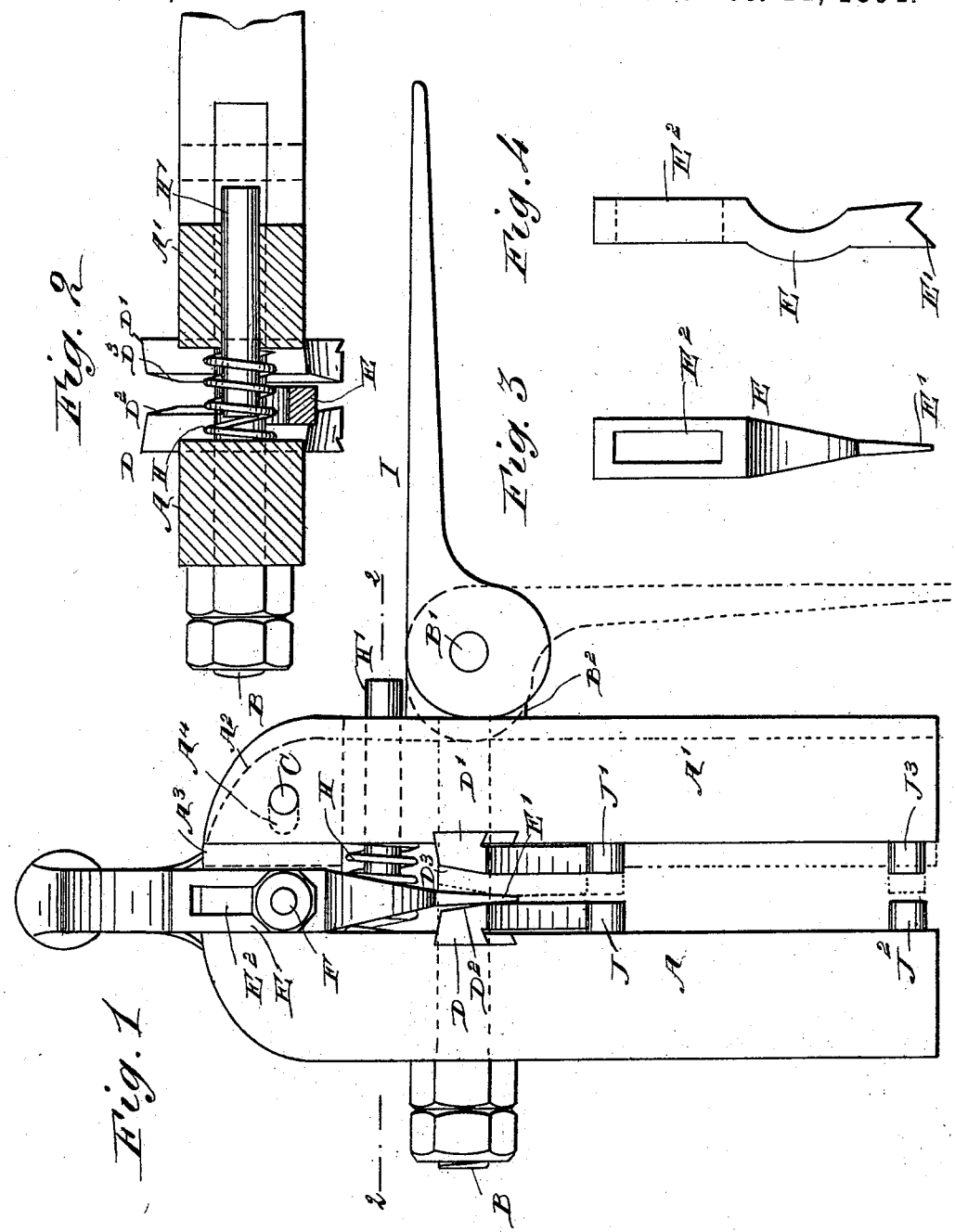

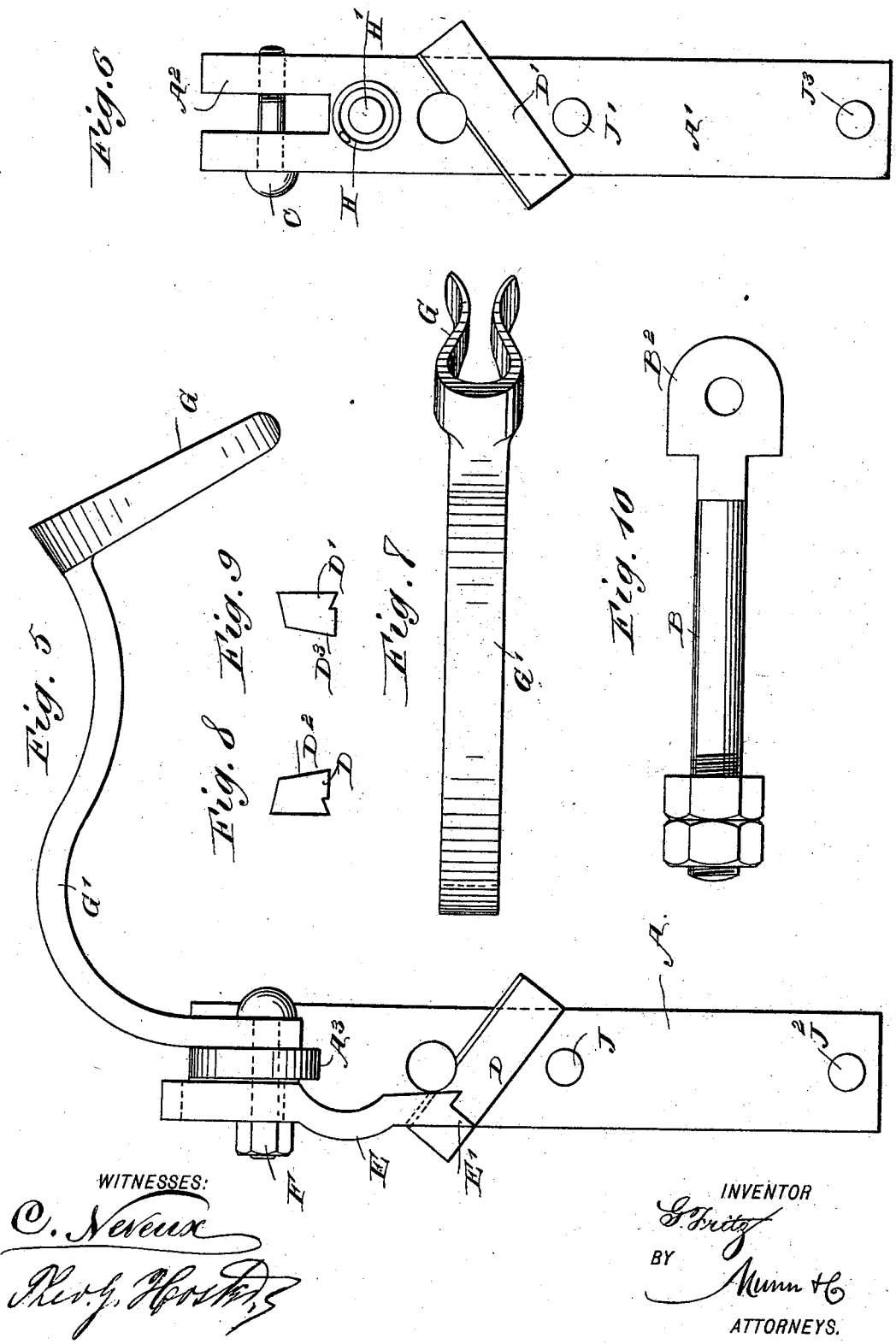

GEORGE FRITZ, OF RIB LAKE, WISCONSIN.

DEVICE FOR SIDE-DRESSING SAW-TEETH.

SPECIFICATION forming part of Letters Patent No. 530,833, dated December 11, 1894.

Application filed June 13, 1894. Serial No. 514,425. (No model.)

*To all whom it may concern:*

Be it known that I, GEORGE FRITZ, of Rib Lake, in the county of Taylor and State of Wisconsin, have invented a new and Improved Device for Side-Dressing Saw-Teeth, of which the following is a full, clear, and exact description.

The object of the invention is to provide a new and improved device for use on band or gang saws after they are swaged, the said device being comparatively simple and durable in construction, and arranged to quickly, uniformly and accurately dress both sides of the teeth of the saw.

The invention consists in certain parts and details, and combinations of the same, as will be hereinafter described and then pointed out in the claims.

Reference is to be had to the accompanying drawings, forming part of this specification, in which similar letters of reference indicate corresponding parts in all the views.

Figure 1 is a rear end elevation of the improvement. Fig. 2 is a sectional plan view of the same, on the line 2—2 of Fig. 1. Fig. 3 is an end elevation of the tooth guide. Fig. 4 is a side elevation of the same. Fig. 5 is a side elevation of one arm carrying one of the jaws and a tooth guide. Fig. 6 is an inner face view of the other arm. Fig. 7 is a plan view of the saw guide. Figs. 8 and 9 are end elevations of the jaws; and Fig. 10 is a side elevation of the guide bolt for the arms.

The improved device is provided with two oppositely arranged frame arms A and A', fitted to slide on a guide bolt B and on a bolt C, held in the forked upper end $A^2$ of the arm A', to be engaged by a slot $A^4$ formed in a lug $A^3$ projecting from the other arm A, as will be readily understood by reference to Figs. 1 and 6.

On the opposite faces of the arms A and A' are dovetailed or otherwise fastened the jaws D and D', extending in an oblique position on the arms, and formed on their opposite faces with the bevels $D^2$ and $D^3$, to engage the sides of a tooth, as hereinafter more fully described. Intermediate of the jaws D D', is arranged the lower V-shaped end E' of a tooth guide E, formed in its upper end with a vertically disposed slot $E^2$, through which passes a bolt F, held on the lug $A^3$ and serving to fasten the said tooth guide in position after the latter has been vertically adjusted so as to bring its lower V-shaped end in proper position relative to a certain point on the bevels $D^2$ and $D^3$ of the jaws D and D'. On the bolt F is also held an arm G', carrying a saw clamp G, shown in detail in Figs. 5 and 7, to securely hold the saw blade in position during the operation of dressing the teeth, as hereinafter more fully described.

The two arms A and A' are pressed apart to open the jaws D and D' by a spring H, coiled on a pin H' held adjustably in the arm A', the said pin serving to limit the closing movement of the arm A' relative to the arm A, according to the width of the teeth of the saw under treatment. The pin H' is adjusted toward and from the inner face of the arm A, according to the desired width of the teeth, the said pin being so adjusted that when the arms are closed and the jaws compress the teeth to the desired width, the inner end of the pin abuts on the arm A and prevents further closing. A set screw or other suitable means may be employed for securing the pin H' in place.

The closing of the arm A' is accomplished by means of a cam lever I, fulcrumed on a pin B' held in the head $B^2$ of the bolt B, the handle of the said cam lever being under the control of the operator, so that when the cam lever stands in the position shown in Fig. 1, the arms A and A' are held apart and the jaws D D' are open, and when the said cam lever I is pressed downward into the position shown in dotted lines in Fig. 1, then the arm A' is moved toward the arm A, and the jaws close to dress the sides of the tooth between the bevels $D^2$ and $D^3$.

On the opposite faces of the arms A A', are arranged sets of regulating lugs J, J', $J^2$, $J^3$, adapted to engage the saw blade at a time when the cam lever I is actuated to close the jaws as above described.

In dressing a saw, the saw blade is passed between the arms A A', and into the forked end of the clamp G, so that the front and back of the tooth engage the V-shaped end E' of the tooth guide E, after which the operator presses the cam lever I, to close the jaws, to cause their bevels D² D³ to act on the sides of the same so as to press the tooth to the desired width. Now, it is understood that by adjusting the tooth guide E vertically, the teeth of the saw are passed between wider or narrower spaces formed by the bevels D², D³ of the jaws D, D', so that the teeth can be dressed to any desired width between the beveled jaws. It will further be seen that by the arrangement described, each tooth is left widest at the extreme point and also wider on the face of the tooth than on the back thereof, so that the tooth is properly dressed by one single movement of the lever I.

After one tooth has been set or dressed as described, then the operator swings the cam lever I back to its normal position, to permit the arm A' to return to its outermost position by the action of the spring H. The device is now shifted so that the next tooth is brought into engagement with the V-shaped end E' of the tooth guide E, after which the cam lever I is again pressed downward and the above described operation is repeated, that is, the second tooth is pressed on its sides by the jaws D D', and at the front and back by the V-shaped lower end E' of the tooth guide E.

It is understood that it is as essential that the tooth of a saw should be widest on the face or cutting side as it is to have the tooth swaged, as no saw will cut well that has its side pressed square, as the corners of the cutting edge soon wear off and leave the tooth narrowest on its face or cutting edge, thus causing the tooth to heat the edge of the saw.

In band saws it frequently happens that some of the teeth will become broken off at the points so as to make the broken teeth a trifle shorter than the rest. Now it is waste to cut all the rest of the teeth to conform to the few short teeth in the saw, and if the teeth are not cut down all the side filing will dress the short teeth the narrowest, so that when the saw is used, every short tooth will leave a mark in the lumber.

By my device a short tooth is dressed just as accurately as any tooth in the saw, so that a clear cut is made by each tooth in the saw.

Having thus described my invention, I claim as new and desire to secure by Letters Patent—

1. A device for dressing saw teeth comprising two arms, means for moving the said arms toward and from each other, a vertically adjustable tooth guide supported from one of said arms and adapted to engage with its lower end the front and back of a tooth, beveled jaws secured on the said arms and adapted to engage the sides of a tooth, the said beveled jaws being arranged obliquely on the said arms, whereby the tooth operated upon by the said jaws is left wider at the extreme point, and also wider on the face or cutting side of the tooth than on the back thereof, as and for the purpose set forth.

2. A device for dressing saw teeth, comprising two arms loosely connected with each other at their upper parts, beveled jaws held in an inclined position on the said arms, a tooth guide supported from one of said arms, a guide bolt on which one of said arms is adapted to slide toward and from the other, means carried by the guide bolt for moving the said arms to close the jaws, and a spring to open the jaws, substantially as shown and described.

3. A device for dressing saw teeth, comprising an arm having a lug projecting from its upper part and provided with a slot, a second arm provided with a forked upper end secured to the said lug by means of a bolt passing through the said slot, a guide on which one of said arms is adapted to slide toward and from the other, a spring arranged to press the arms apart, a cam lever to move one of said arms toward the other, beveled jaws held in an inclined position on the said arms and adapted to engage the sides of a tooth, and a tooth guide supported from one of the arms and extending with its lower end intermediate of the jaws to engage the front and back of a tooth while the jaws operate on the sides thereof, substantially as set forth.

4. A device for dressing saw teeth, comprising two arms adapted to move toward and from each other, beveled jaws held in an inclined position on the said arms and adapted to engage the sides of a tooth, a tooth guide supported from one of the arms and extending intermediate of the jaws to engage the front and back of a tooth, a saw clamp supported from one of said arms and means for moving the arms toward and from each other to open and close the jaws, substantially as shown and described.

5. A device for dressing saw teeth comprising two arms, jaws held on the said arms to engage the sides of a tooth, a tooth guide supported from one of the said arms to engage the front and back of a tooth, a guide bolt passing through the said arms and on which one of said arms is adapted to move toward and from the other, and a cam lever fulcrumed on said bolt and engaging the said movable arm, substantially as shown and described.

6. A device for dressing saw teeth, comprising two arms adapted to move toward and from each other and provided with projecting lugs on their opposing faces for the purpose set forth, beveled jaws held in an inclined position on the said arms a tooth guide supported from one of said arms, a spring arranged to force the arms apart, an adjustable pin on which the said spring is coiled, the said pin serving to limit the closing movement of the arm, and means for moving the arms toward each other, substantially as shown and described.

GEORGE FRITZ.

Witnesses:
H. L. TRIMBLE,
O. C. ARMSTRONG.